June 1, 1948.    R. W. LELAND    2,442,654
REMOTE CONTROLLED ELECTRIC MOTOR SYSTEM
Filed Nov. 20, 1946
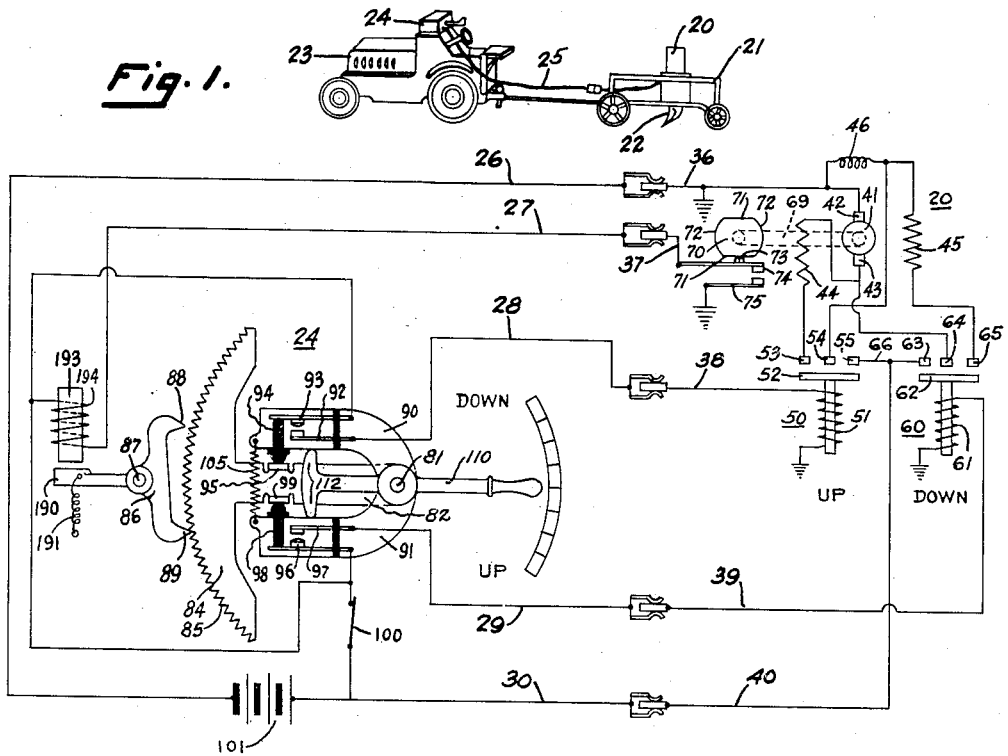
Fig. 1.
Fig. 2.
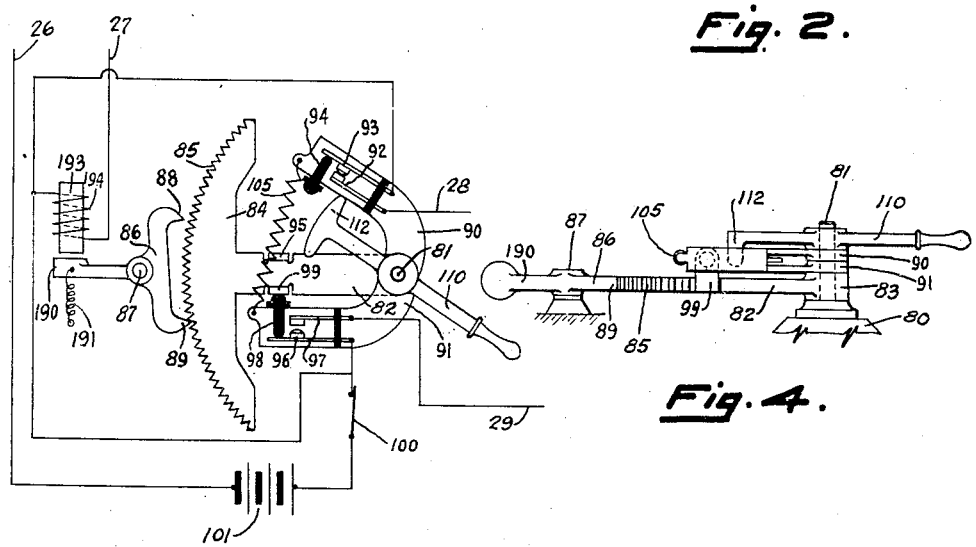
Fig. 3.
Fig. 4.
INVENTOR.
ROBERT W. LELAND
BY
Spencer, Hardman & Fehr
HIS ATTORNEYS.

Patented June 1, 1948

2,442,654

UNITED STATES PATENT OFFICE 2,442,654

REMOTE-CONTROLLED ELECTRIC MOTOR SYSTEM

Robert W. Leland, Dayton, Ohio, assignor to General Motors Corporation, Detroit, Mich., a corporation of Delaware Application November 20, 1946, Serial No. 711,108

9 Claims. (Cl. 318—21)

This invention relates to improvements in control devices for electric motors and particularly remote control devices for reversible electric motors.

It is among the objects of the present invention to provide a control device for an electric motor, adapted to be adjusted to any selected position so that it will limit the operation of the electric motor, in one direction or the other, to a predetermined number of revolutions corresponding to the particular adjustment at which the device has been set.

Another object of the present invention is to provide a control device for a reversible electric motor in which the manually adjustable mechanism of the device may be installed upon one device or at one location and electrically connected to the electric motor and its associated elements installed on a remote device or at location remote from the adjustable mechanism.

Further objects and advantages of the present invention will be apparent from the following description, reference being had to the accompanying drawing, wherein a preferred embodiment of the present invention is clearly shown.

In the drawing:

Fig. 1 is a small perspective view illustrating a tractor on which the adjustable mechanism of the control device is mounted and to which a wheeled plow is attached, said plow carrying the reversible motor and its associated parts.

Fig. 2 is a diagrammatic view of the control device and its component parts.

Fig. 3 is a portion of the view shown in Fig. 2 with parts shown in another position, however.

Fig. 4 is a detail view of the adjustable parts of the control device.

The electric motor of the present invention is of the reversible type and may form one element of a unit including motor driven, speed reducing gearing, and a driven screw shaft upon which a traveling nut is threadedly attached. The nut is adapted to have the load secured thereto so that rotation of the screw shaft by the motor in one direction or the other, raises or lowers the load by the upward or downward movement of the nut on the screw shaft. A unit of this kind is clearly illustrated and described in the United States Patent No. 2,383,901, issued August 28, 1945, to Calvin J. Werner. In the patent, the load is the landing gear of an airplane while in the present application, the load is a plow share which may be raised or lowered by the operation of the reversible electric motor. The present invention relates only to the control device of the reversible electric motor, said device being adapted to limit the rotations of the motor in one direction or the other to any selected number whereby the load, actuated by the motor, may be raised or lowered to any desirable degree.

The electric motor of the present invention is designated by the numeral 20 and, as shown in Fig. 1, is mounted on a wheeled plow 21, and is adapted to raise or lower the plow share 22 through suitable mechanism connected therebetween. The wheeled plow forms a trailer attached to the tractor 23 upon which the adjustable unit 24 of the control device is mounted. A cable 25 consisting of a plurality of wires 26, 27, 28, 29 and 30 extends from the unit 24. Each of these wires has one portion of a connector adapted to engage connectors attached to wires 36, 37, 38, 39 and 40 leading from the motor and its associated elements carried by the plow. Thus the control device unit 24 on the tractor may be connected to any other motor installation of similar character which may be mounted on any other implement.

The electric motor 20 is of the compound wound type acting as a series motor when rotating in one direction and as a shunt motor when operating in the other direction. In this instance the motor is of the series type when operating to raise the load and of the shunt type when operating to lower the load. The motor comprises a rotor or armature 41, the commutator of which is engaged by brushes 42 and 43. The series field winding 44 has its one end connected to the brush 43 and its other end to stationary contact 53 of the electromagnetic contactor 50. Shunt winding 45 has its one end connected to wire 36 leading to brush 42, the other end to the stationary contact 65 of the electromagnetic contactor 60. A winding 46, which is the magnet winding for energizing the magnetic clutch operative to connect the motor shaft with the speed reducing gearing, interposed between the said shaft and the screw shaft upon which the load moving nut is threadedly supported, is connected between field winding 45 and the brush 42.

The electromagnetic contactors 50 and 60 are identical, each respectively having magnet windings 51 and 61, contact bridging armatures 52 and 62 and stationary contacts 53, 54, 55 and 63, 64, 65. The contacts 55—63 of the two contactors are connected together by wire 66. One end of both windings 51 and 61 are grounded, the other end of winding 51 is connected to wire 38 while winding 61 is connected to wire 39. Wire 40 is connected to both contacts 55 and 63 of contactors 50 and 60, respectively, by wire 66. On the armature shaft 69, there is mounted a cam 70 so as to rotate with said shaft, the cam having oppositely disposed low flat surfaces 71 and high arcuate surfaces 72 all of substantially equal dwell for the rubbing block 73 on the contact 74 of the timer or make and break device which has also a grounded stationary contact 75 engaged by contact 74 when the block 73 dwells on surfaces 72 of the motor rotated cam. Contacts 74 and 75 are disengaged when the rubbing block 73 dwells on flat surfaces 71 of cam 70. Contact 74 is connected to wire 37.

The mechanism described in the two aforegoing paragraphs is carried by the trailer, a plow in the present instance. The other mechanism of the control device of the present invention, which includes the unit 24, is mounted upon the tractor 23. The elements comprising unit 24 are diagrammatically shown in the Figs. 2 and 3. A base 80 supports a post 81 which pivotally supports several elements of the device. A switch actuator 82 has a hub portion 83 pivotally mounted on the post 81, the free or outer end of said actuator being in the form of a sector 84 whose arcuate edge is provided with a plurality of equally spaced teeth 85. This sector forms the wheel element of an escapement mechanism including also a pallet 86 pivoted at 87 and having predeterminately spaced prongs 88 and 89 adapted alternately to engage the teeth 85 of the actuator or wheel and limit its rotation in either direction to intermittent, measured steps of equal degree. Pallet 86 has an arm 190 extending therefrom, forming an armature urged into one position by a spring 191 but adapted to be attracted and moved by the electromagnet 193 when it is energized. The winding 194 of the electromagnet 193 has its one end connected by wire 27 and its connector to wire 37 which leads to contact 74 of the motor driven make and break device including cam 70, so that according to the present drawing, electromagnet 193 will be energized twice during each revolution of the armature shaft 69 of the motor 20. When the pallet 86 is in normal position under the influence of spring 191, the prong 89 thereof engages the actuator-wheel and locks it against rotation. On the other hand when the pallet 86 is attracted by the electromagnet 193, then prong 89 is disengaged from the actuator-wheel 84 but not before prong 88 has been moved into a space between teeth so that it will stop movement of the actuator-wheel 84 after it has rotated a predetermined number of degrees in one direction or the other.

The common pivot post 81 also hingedly supports two oppositely disposed arms 90 and 91 so that a straight portion of each arm may be substantially parallel with and in juxtaposition to a respective side of the actuator 82. Each arm supports a switch. The switch on arm 90 comprises cooperating stationary and movable contacts 92 and 93 respectively and an operating plunger 94, one end of which engages the movable contact 93 and the other end extending outside the switch and adapted to engage an abutment lug 95 on the actuator so that said plunger 94 may maintain the contact 93 out of engagement with the contact 92. The switch on arm 91 comprises movable contact 96 engageable with the stationary contact 97 when the plunger 98 of the switch is not in engagement with the abutment lug 99 on the actuator 82. The movable contacts 93—96 of the two switches are connected through a master switch 100 and wires 30—40 with the two feeder, stationary contacts 55—63 of the electromagnetic contactors 50—60 respectively. Master switch 100 is also connected to one side of the source of electric power, a storage battery 101 in this instance, the other side of the battery being connected through wires 26—36, with the motor brush 42. The one end of the winding of electromagnet 93 is also connected through the master switch 100, with the storage battery.

In order, normally to urge the arms 90 and 91 so that the respective plungers 94 and 98 of the two switches engage the respective abutment lugs 95 and 99 of the actuator and thereby maintain the contacts of the respective switches disengaged and in the circuit breaking position, a spring 105 is connected between said arms 90 and 91, which constantly biases the arms toward the respective sides of the actuator.

The control unit is adjustable to cause the motor to operate for the desired number of revolutions. A lever 110 is pivotally carried substantially midway between its ends, by the pivot post 81. A handle is formed at one end of this lever 110 and a head 112 is at its opposite end, said head being in the form of two oppositely disposed lugs extending from the lever, one toward the switch on arm 90, the other toward the switch on arm 91. Lever 110 is movable about the pivot post 81 in either direction. As the lever is rotated its head 112 will engage one or other other switch and the respective arm 90 or 91 will be rotated about the pivot post 81 to move the arm and particularly the switch thereon away from the actuator. This consequently moves the respective switch plunger 94 or 98 out of engagement with the respective actuator lug 95 or 99, thereby permitting the contacts of the adjusted switch to assume their circuit making positions. At the same time, the movement of one or the other of said arms 90 or 91 away from the switch actuator will increasedly tension the spring 105 causing it to urge the actuator and its engaging switch to follow the movement of the adjusted closed switch. The actuator cannot ordinarily follow, due to the fact that it is locked against movement by the escapement mechanism which must be actuated to permit the actuator so to move. This results, however, by the closing of either of the switches on arms 90 or 91, for as either switch closes, the motor 20 is rendered active and thus the circuit make and break device comprising cam controlled contacts 74 and 75 effects operation of the pallet 86 of the escapement mechanism in proper timed relation with the revolutions of the motor shaft 69.

As shown in Fig. 2, lever 110 is rotatable into any number of selected positions between the limits marked "Up" and "Down." In Fig. 2, the lever is in the intermediate position with both switches in their normal, open positions indicating that the motor has performed its function of moving the plow share 22 in the present installation, into its half-way down position. Now supposing the operator, riding on the tractor 23 desires completely to raise the plow share 22. He moves lever 110 from the position shown in Fig. 2 to the position shown in Fig. 3 which is the extreme "Up" position. Moving the lever 110 into this position actuates the arm 90 so that the plunger 94 of the switch thereon is disengaged from the actuator lug 95 and the contact 93 of said switch permitted to engage its cooperating stationary contact 92. Spring 105 is increasedly tensioned and the plunger 98 of the switch on arm 91 is urged against the actuator lug 99 more forcibly, thus urging said actuator to rotate clockwise, as regards Fig. 3, to approach the switch on arm 90. The pallet 86, which engages the toothed sector 84 of the actuator, will, however, not permit such movement unrestrained. When contacts 92 and 93 of the switch on arm 90 engage, they complete a circuit from the storage battery 101 through master switch 100, contacts 93—92, wires 28—38, winding 51 of contactor 50, ground connections to wire 36 then via wire 26 back to the battery. This energizes winding 51 causing the bridging armature 52 to move into engagement with stationary contacts 53, 54 and 55. Now current from the battery 101 flows through wires 30, 40 and to contact 55, bridge 52 to contacts 54 and 53. From contact 54, current will flow through the magnetic clutch coil 46 to wire 36. From contact 53, the flow is through the series field winding 44, brush 43, armature 41, brush 42 to wire 36 from whence both circuits, just described, will be completed through wire 26 to the battery. With these circuits completed the motor 20 becomes operative, rotating in a direction to cause the plow share 22 to be lifted. As the motor operates the shaft 69 and the cam 70 therein will be rotated, the cam closing and opening the contacts 74 and 75 twice for each revolution of the motor shaft in the particular installation illustrated. These contacts 74—75, when closed, cause magnet winding 194 of electromagnet 193 to be energized for attracting the armature 190 and rotating the pallet 86 clockwise as regards Fig. 2 and 3, thereby moving its prong 89 out of engagement with the actuator segment 84 to release it and previous to full release of the segment, moving the prong 88 of the pallet into the path of a tooth 85 on the segment to limit segment movement to a measured degree. As soon as contacts 74—75 are separated by the rubbing block 73 riding on one of the flats 71 of the cam 70, then the circuit including the coil 194 of magnet 193 is broken and the coil deenergized. Now the spring 191 rotates the pallet 86 counterclockwise, lifting prong 88 from engagement with the toothed segment 84 and moving the prong 89 into locking engagement therewith, again permitting the actuator to rotate clockwise or toward the open switch on arm 90 a measured distance only. As illustrated, for each revolution of the motor shaft 69 and its cam 70, the actuator is permitted to move through two measured equal steps toward said open switch. The device may be designed so that any predetermined number of revolutions of the motor shaft 69 are required to move the plow share 22 from its midway position into its extreme "Up" or retracted position, therefore the actuator must move through intermittent, measured steps equal to a definite number of motor revolutions, before the actuator lug 95 again engages and moves plunger 94 to separate contacts 93—92 and stop motor operation by deenergizing the contactor 50 and breaking the motor circuits.

The lever 110 may be actuated to any one of a number of positions to obtain the necessary motor revolution for performing the desired work, in this instance the moving of the plow share 22 upwardly or downwardly into the selected position.

All connectors on wires 26 to 30 and 36 to 40 may respectively be grouped into one unit each so that they may properly be connected to effect proper operation and control.

While the embodiment of the present invention as herein disclosed, constitutes a preferred form, it is to be understood that other forms might be adopted, all coming within the scope of the claims which follow.

What is claimed is as follows:

1. A control device for a reversible electric motor adapted to be connected to a source of electric power, comprising in combination, a switch actuator movable through equal, intermittent steps in either direction only when the motor is operating; two switches, each adapted, when closed, to effect motor operation in a respective direction; tension means interposed between the switches and urging each into engagement with a respective side of the actuator for maintaining said switches open; and means extending between said switches, operative into any one of a plurality of positions in either direction for moving either one of the switches out of engagement with the actuator, and causing the switch to close.

2. A control device for a reversible electric motor adapted to be connected to a source of electric power, comprising in combination, a rotatable switch actuator; motor controlled means operative to permit rotation of the actuator in either direction in intermittent, equal steps of movement; two switches, each adapted, when closed, to effect motor operation in a respective direction, each switch being mounted, bodily movable, on a respective side of the actuator; tension means connected to the switches and urging them into engagement with the respective sides of the actuator for maintaining the switches open; and a manually operable lever having a portion interposed between the switch, said lever being operative to move either switch into any one of a plurality of positions away from the actuator whereby the moved switch is closed to effect operation of the motor in one direction and the tension means effective to urge the actuator toward the closed switch as said actuator is permitted so to move by the motor controlled means.

3. A control device for a reversible electric motor adapted to be connected to a source of electric power, comprising in combination, a switch actuator having a lever pivoted at its one end and a toothed sector forming its free end; a motor controlled pallet engageable with the toothed sector and operative to effect intermittent movement of the switch actuator in either direction when the motor is operating; a pivotally mounted switch on each side of the actuator lever; spring means connected between the switches urging them toward each other and into engagement with the respective sides of the actuator lever for maintaining said switches open, the switches, when closed, effecting operation of the motor in different directions respectively; and a pivoted lever having its one end extending between the switches, and operative to move one or the other switch away from the actuator lever whereby said moved switch is closed and the spring means tensioned to effect movement of the actuator toward the closed switch as the pallet controls actuator movement during motor operation.

4. A control device for a reversible electric motor adapted to be connected to a source of electric power, comprising in combination, a pivoted switch actuator having a toothed arcuate portion; a pallet engageable with said toothed portion of the actuator to render its movement intermittent; an electromagnet intermittently energized during operation of the motor, for actuating the pallet; two switches pivotally supported coaxially of the actuator, one switch at each side of said actuator; a spring connected between the switches, yieldably urging them toward and into engagement with the actuator whereby said switches are maintained open, closing of a switch effecting motor operation in a respective direction; and a lever pivoted axially of the actuator, having a portion interposed between the switches and rotatable to engage and move either switch away from the actuator whereby said switch is closed and the spring means between the switches increasedly tensioned to urge the actuator and its engaging switch toward the open switch under the control of the motor controlled pallet.

5. A control device for a reversible electric motor adapted to be connected to a source of electric power, comprising in combination, a circuit make and break device operated at timed intervals by the motor; and a unitary control mechanism comprising a single supporting post, an actuator pivotally carried by the post, an arm at each side of the actuator, both arms being pivotally carried by the post, a switch carried by each arm, each switch, when closed, effecting operation of the electric motor in a respective direction, spring means connected between said arms and urging each toward the actuator so that the actuator engages a part of each switch to maintain it open, a lever pivotally mounted on the post and having a portion interposed between the arms, said lever being operative to engage and rotate one or the other arm away from the actuator for causing the switch on said rotated arm to close and also to tension the spring means for urging the open switch and the actuator toward the closed switch, and an escapement device including a toothed sector on the actuator, an engaging pallet and a pallet operating electromagnet, the energization of which is controlled by the make and break device for causing the actuator to move intermittently and in accordance with motor rotation.

6. A control device for a reversible electric motor adapted to be connected to a source of electric power, comprising in combination, a circuit interrupter operated at timed intervals by the motor; a pair of switches, each switch mounted so as to be movable bodily, one independent of the other and each, when closed, effecting operation of the motor in a respective direction; an actuator extending between the switches and capable of movement coinciding with the movement of the switches; spring means connected between the switches and urging each against a respective side of the actuator for opening said switches; and adjusting lever operative to move one or the other switch away from the actuator whereby said moved switch is closed and the spring means increasingly tensioned to urge the open switch and actuator engaged thereby toward in engagement with the closed switch; and means engageable with the actuator and rendered effective by the operation of the circuit interrupter for confining the movement of the actuator to intermittent equal steps.

7. A remote control device for a reversible electric motor adapted to be connected to a source of electric power, comprising in combination, a circuit make and break device operated at timed intervals during each revolution of the motor; two normally open, electromagnetically actuated contactors, each adapted to be closed to render the motor operative in a respective direction; two switches, each bodily movable, one independently of the other, each switch, when closed, being adapted to effect the energization of a respective contactor; an actuator movable in either direction; spring means connected between the switches and urging each into engagement with a respective side of the actuator whereby the switches are held open; a manually operable lever having an end portion extending between the switches and operative to move either switch away from the actuator whereby the switch will close and the spring means tensioned for urging the other open switch and the actuator engaged thereby toward the closed switch; an escapement mechanism engaging the actuator and controlled by the make and break device for limiting the movement of the actuator to a measured, intermittent step for each operation of said device.

8. A control device for a reversible electric motor adapted to be connected to a source of electric power, comprising in combination, a switch actuator capable of movement in opposite directions; a switch on each side of the actuator movable with and relatively to the actuator, each switch, when closed, effecting motor operation in one direction respectively; tension means urging each switch into engagement with the actuator to hold said switch open; a manually operable lever movable to engage either switch and move it away from and into selective spaced relation with the actuator, thereby closing the moved switch and adjusting the tension means to urge the actuator and the engaging open switch toward the closed switch; and motor controlled means for limiting the movement of the actuator to measured, intermittent steps.

9. A control device for a reversible electric motor adapted to be connected to a source of power, comprising in combination, two switches, each adapted to be closed to render the motor operative in one or the other direction respectively; an escapement including a pivoted toothed member, a pallet for controlling the movement of the toothed member in either direction and an electromagnet for actuating the pallet; pivoted means, supporting each switch, one on each side of the toothed member; spring means interposed between said pivoted means and yieldably urging the switches into engagement with the toothed member for maintaining the switches open; a control lever between said switch supporting means and operative to move one or the other switch out of engagement with the toothed member for causing the switch to close and render the motor operative in one direction; and mechanism actuated by the motor, intermittently to energize the electromagnet to actuate the pallet whereby the toothed member is permitted intermittently to move under the effect of the biased spring means again to engage the closed switch and open it to stop motor operation.

ROBERT W. LELAND.